Aug. 28, 1956
S. E. REA
2,760,399
BLIND TYPE FASTENER HAVING ADJUSTABLE
TAPERED EXPANSION MEANS
Filed July 22, 1952
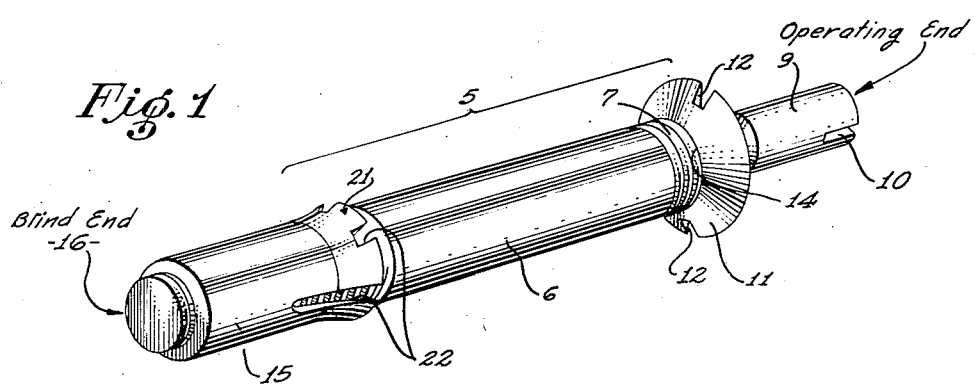
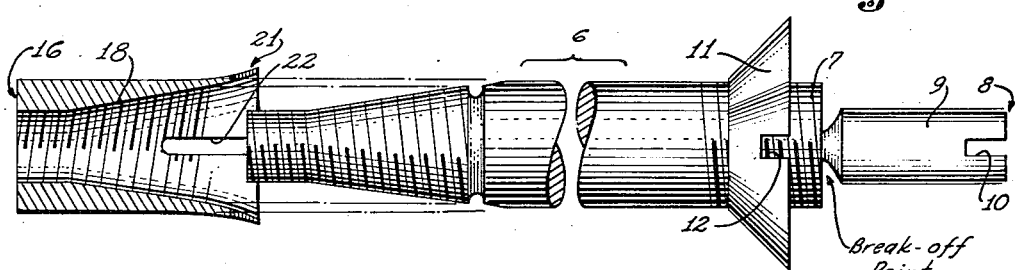
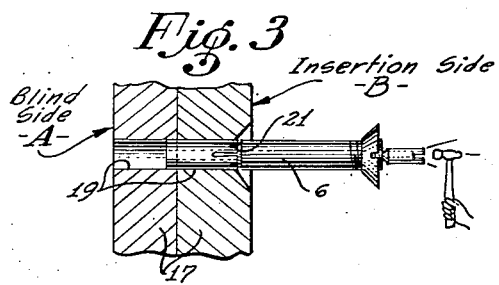
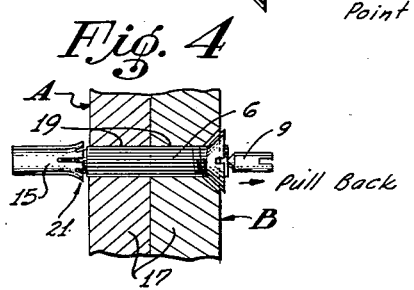
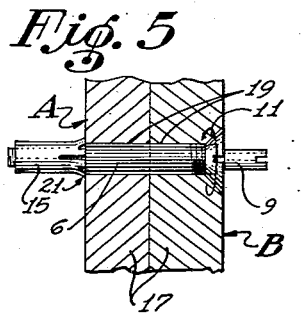
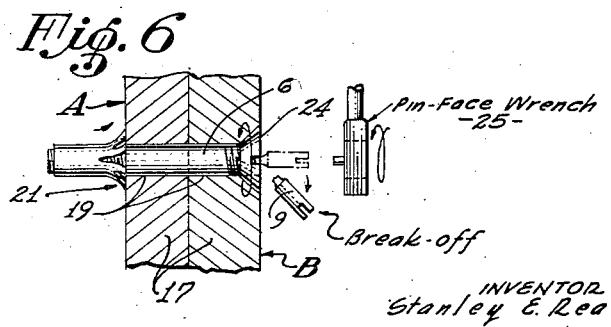
INVENTOR
Stanley E. Rea
By Herbert E. Metcalf
HIS PATENT ATTORNEY United States Patent Office 2,760,399
Patented Aug. 28, 1956

2,760,399

BLIND TYPE FASTENER HAVING ADJUSTABLE TAPERED EXPANSION MEANS

Stanley E. Rea, Redondo Beach, Calif., assignor to Northrop Aircraft, Inc., Hawthorne, Calif., a corporation of California Application July 22, 1952, Serial No. 300,264

1 Claim. (Cl. 85—1)

The present invention relates to fasteners, and more particularly to a blind type metal fastener.

In the practical use of blind fasteners, the workpiece or workpieces to be fastened are usually fastened from one side only, the other side being inaccessible to the worker.

Some of the objects of the present invention are:

To provide a high strength blind fastener of simple construction, which can be inserted in a workpiece from one side thereof, and securely locked in tension therein;

To provide a blind fastener having a substantial range of adjustment for tension stress prior to locking;

To provide a novel blind fastener having a substantial range of adjustment for workpieces of varying thicknesses;

And to provide a blind fastener having high shear strength.

Other objects will become evident as the description continues.

Briefly, in one preferred embodiment, the present invention takes the form of a solid cylindrical metal rod which is threaded at each end thereof. A break-off member is provided outwardly of one threaded end for rotating the rod from the operating end thereof after the rod has been inserted in a bore and resilient anchor means is provided on the other end of the bolt to lock the rod from the blind side of the workpiece after the rod has been inserted therein. An adjustment fastener nut is provided on the operating end of the rod which locks the fastener in place after insertion, and facilitates adjustment thereof in the bore of a workpiece to be fastened. The diameter of the rod is preferably sized to a sliding fit with the bore through which the same is extended.

The present invention will be more clearly understood by reference to the specification drawings in which:

Figure 1 is an assembled view in perspective of one embodiment of the fastener of the present invention.

Figure 2 is a diagrammatic, longitudinal, partially sectional view of the side elevation of the invention shown in Figure 1.

Figure 3 is a diagrammatic side elevational view of the fastener of Figures 1 and 2 ready for insertion in a bore.

Figure 4 is a diagrammatic side elevational view of the fastener of Figure 3 after being completely inserted in the bore.

Figure 5 is a diagrammatic side elevational view of the fastener of Figures 3 and 4 being tightened in the bore.

Figure 6 is a diagrammatic side elevational view of the fastener after being securely tightened in the bore, with the break-off pin being broken away.

Referring first to Figures 1 and 2, a completely assembled blind fastener 5 is shown wherein a cylindrical solid metal rod 6 preferably of hard steel of a desired length is threaded at each end thereof; the threads 7 at the operating end 8 being positioned inwardly of the rod 6 end which terminates with a break-off member 9. The break-off member 9 has a slot 10 in the outer end thereof so that the entire rod 6 can be rotated from that end by means of a screw driver for example. A tapered nut 11 is threaded over the inwardly positioned threads 7 of the rod 6, and is provided with a slot 12 on each side of its threaded bore 14 so that the tapered nut 11 can be independently rotated on the rod 6, to bring a spring tempered metal flared sleeve 15, which is threaded on the tapered threaded portion 18 of the blind end 16 of rod 6, into tension as will be described.

In Figures 3, 4, 5 and 6, a pair of abutting workpieces 17 to be fastened have a blind side A, and an insertion or operating side B, and are provided with bores 19 sized to a sliding fit with the rod 6; the bores 19 being aligned for receiving the fastener 5 therethrough. In the present example, the outer opening of the bore 19 on the insertion side B of the workpiece is countersunk so that the end of the fastener can be made flush with outer surface of the workpiece. The fastener 5 is assembled prior to insertion thereof into the aligned bores 19, and is then extended through the aligned bores 19 with the blind end 16 having the flared sleeve 15 thereon inserted first. The flared end 21 of the spring tempered sleeve 15 is preferably made to be normally larger than the diameter of the bores 19 and has a number of slots 22 extending longitudinally inwardly lengthwise of the sleeve 15. The slots 22 will permit relief of the flared end 21 which is forced radially inwardly through the bores 19 when the anchor sleeve 15 is driven through the workpieces 17 as shown in Figure 3. When the anchor sleeve 15 is completely through the bores 19 and emerges from the other end thereof, the flared end 21 will spring back to its original diameter as shown in Figure 4. The tapered nut 11 is then rotatably adjusted until the flared end 21 of the anchor sleeve 15 is brought rearwardly over the outer opening of the bore on the blind side A after emerging therefrom, and into tight contact with the blind side A of the workpieces 17 around the bore 19 opening, rod 6 being prevented from rotating by holding the break-off member 9 stationary. As shown in Figure 6, tapered nut 11 is bottomed within the countersink 20 of the outer bore opening until the flared end 21 of the anchor sleeve 15 on the other side of the workpieces 17 is brought into sufficient tension to securely lock the fastener in place. The break-off member 9 is then broken away to leave the slotted end face 24 of the tapered nut 11 flush with the insertion side A surface of the workpiece 17.

It has thus been shown that the present invention provides a simple but efficient blind fastener of exceptionally high shear strength, which can be readily installed from one side of a workpiece, being flush therewith if desired.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

A flush head high tension and high shear strength blind fastener having in combination, a solid rod having a smooth uninterrupted surface sized to closely fit and extend through aligned bores through workpieces to be fastened, the bore opening on the work side of said workpieces being countersunk, one end of said rod being tapered and provided with a single lead thread and projected out of said bores beyond said workpieces on the blind side thereof, an anchor sleeve having a tapered interior conforming to said tapered end of said rod and provided with a single lead thread engageable with the thread of said tapered rod end, said sleeve having a diameter at one end thereof substantially the same as said bores and gradually increasing to a flare at the other end thereof normally larger than the diameter of said bores, a plurality of longitudinal slots in said sleeve and extending parallel with the axis thereof, said slots opening at the flared end thereof to permit said flared end of said sleeve to be radially contracted to substantially the same diameter as said rod to pass through said bores, the other end of said rod extending out of the countersunk bore beyond said workpieces on the work side thereof and being threaded to receive a nut, said threads on the tapered and other end of said rod helically extend in the same direction, said nut being tapered to fit into said countersink with the face thereof flush with said workpieces, radially extending tool slots in the flush face of said tapered nut, a coaxial break-off stem extending from the end of said rod on the work side of said workpieces, and a tool engaging slot in the end of said stem, whereby said tapered nut can be run into said countersunk bore and tightened to bring said flared sleeve on the blind side of said workpieces into tension therewith while said rod is held stationary by means of said break-off stem.

References Cited in the file of this patent

UNITED STATES PATENTS

| | | |
|---|---|---|
| 91,907 | Burnett | June 29, 1869 |
| 1,434,456 | Sturgeon | Nov. 7, 1922 |
| 1,842,741 | Bengtsson | Jan. 26, 1932 |
| 2,026,686 | Kirley | Jan. 7, 1936 |
| 2,282,711 | Eklund | May 12, 1942 |
| 2,387,468 | Ritzel | Oct. 23, 1945 |

FOREIGN PATENTS

| | | |
|---|---|---|
| 553,124 | Great Britain | May 7, 1943 |
| 641,812 | Great Britain | Aug. 23, 1950 |